United States Patent [19]

King

[11] Patent Number: 4,516,376
[45] Date of Patent: May 14, 1985

[54] ASSEMBLY SYSTEM

[76] Inventor: Lionel W. King, 57, Lakedale Rd., Plumstead, London, England

[21] Appl. No.: 398,900

[22] Filed: Jul. 16, 1982

[30] Foreign Application Priority Data

Feb. 24, 1982 [GB] United Kingdom ............... 8205400

[51] Int. Cl.³ .......................................... E04H 12/00
[52] U.S. Cl. .................................... 52/648; 403/176; 403/171
[58] Field of Search .............. 403/171, 172, 176, 295, 403/205; 52/648, 656

[56] References Cited

U.S. PATENT DOCUMENTS

| 1,269,326 | 6/1918 | Slater | 52/638 |
| 1,645,980 | 10/1927 | Bearly | 403/171 |
| 3,462,893 | 8/1969 | Kaiser | 403/172 |
| 3,726,551 | 4/1973 | Levenberg | 403/172 |
| 3,851,601 | 12/1974 | Davis | 403/171 |
| 3,858,988 | 1/1975 | Field | 403/171 |
| 3,883,257 | 5/1975 | Delafield | 403/172 |
| 3,932,048 | 1/1976 | Dupont | 403/225 |
| 4,049,355 | 9/1977 | Kawazu | 403/172 |
| 4,323,319 | 4/1982 | Adams | 403/171 |
| 4,368,998 | 1/1983 | Pestoor | 403/171 |

FOREIGN PATENT DOCUMENTS

| 1242195 | 12/1959 | France | 403/171 |
| 109355 | 12/1943 | Sweden | 52/638 |
| 1073004 | 6/1967 | United Kingdom . |
| 1261219 | 1/1972 | United Kingdom . |
| 1313299 | 4/1973 | United Kingdom . |
| 1355067 | 5/1974 | United Kingdom . |
| 1410377 | 10/1975 | United Kingdom . |
| 1477727 | 6/1977 | United Kingdom . |
| 2070721 | 9/1981 | United Kingdom . |

Primary Examiner—Henry E. Raduazo
Attorney, Agent, or Firm—Sandler & Greenblum

[57] ABSTRACT

A shelf system comprises structural rods with hollow ends, coupling elements each consisting of a body and a plurality of spigots for interconnecting the ends of the structural members, and shelf brackets designed to fit the ends of the structural members and to be held thereon by the inserted coupling spigots. On each coupling element one spigot is tubular or rod-like and each other spigot consists of a plurality of flat blades of which the edges define an envelope corresponding to the internal cross sections of the rod ends.

4 Claims, 13 Drawing Figures

ASSEMBLY SYSTEM

This invention relates to frame structures and means for assembling frame structures. The invention is particularly applicable to display shelving and similar structures.

The invention concerns structures assembled from structural members which are tubular or have sockets at the ends, with coupling members which fit into the ends of the structural members.

According to one aspect of the present invention, each coupling element has a body from which project at least two coupling spigots engageable in the ends of the structural members, at least one of these spigots consisting of a plurality of flat members of which the edges define an envelope corresponding to the internal profile of the structural members.

Preferably, one of the spigots is tubular or rodlike, and the or each other spigot is as set out above.

A spigot composed of flat members, instead of being cylindrical for example, has two substantial advantages. First, because the flat members do not have a continuous external profile, and do have a certain amount of lateral flexibility, a good fit in the structural members can be obtained without excessively stringent tolerances in the manufacture of the spigot. In particular it is possible to make the coupling of moulded plastics material, in particular injection moulded plastics, without high precision being required to ensure that the spigot will fit into and grip a structural member. The structural members can be simple plastics tubing. The other advantage is that a spigot composed of flat members makes it much easier to strip the injection mould and therefore makes manufacture cheap and quick. Preferably, the spigot consists of a plurality of parallel flat projecting members, and a single further projecting flat member transverse to and interconnecting these, to provide stiffness.

One minor disadvantage of such a spigot is that it can lead to difficulties in the ejection of the spigot from a mould. This problem is overcome if one of the spigots is designed to enable a single large ejector pin to be used. As such a spigot needs to be made to accurate dimensions if it is to fit into and grip a tubular structural member, it is preferred that this spigot is used only to support structural members for which a firm grip is not essential and it is sufficient if the spigot fits into the structural member. This spigot is therefore made to such dimensions as to ensure that it can enter a structural member even at the maximum manufacturing tolerance.

According to another aspect of the present invention, a shelf clip or bracket is provided for support shelves and the like on the structural members of a frame structure assembled from tubular or socketed structural members and spigoted coupling elements. The shelf clip or bracket comprises a socket designed to fit over and seat against the end of a structural member and providing an aperture to receive a spigot of a coupling element; and at least one support arm extending laterally from the seat portion. In use, the clip or bracket is seated over the end of an upright structural member, a coupling element spigot is fitted through the clip or bracket into the end of the structural member, the frame structure being completed by further structural members and coupling elements, and shelves and other objects can then be placed on the projecting arm or arms.

The invention will be further described with reference to the accompanying drawings, in which.

Figure 1:
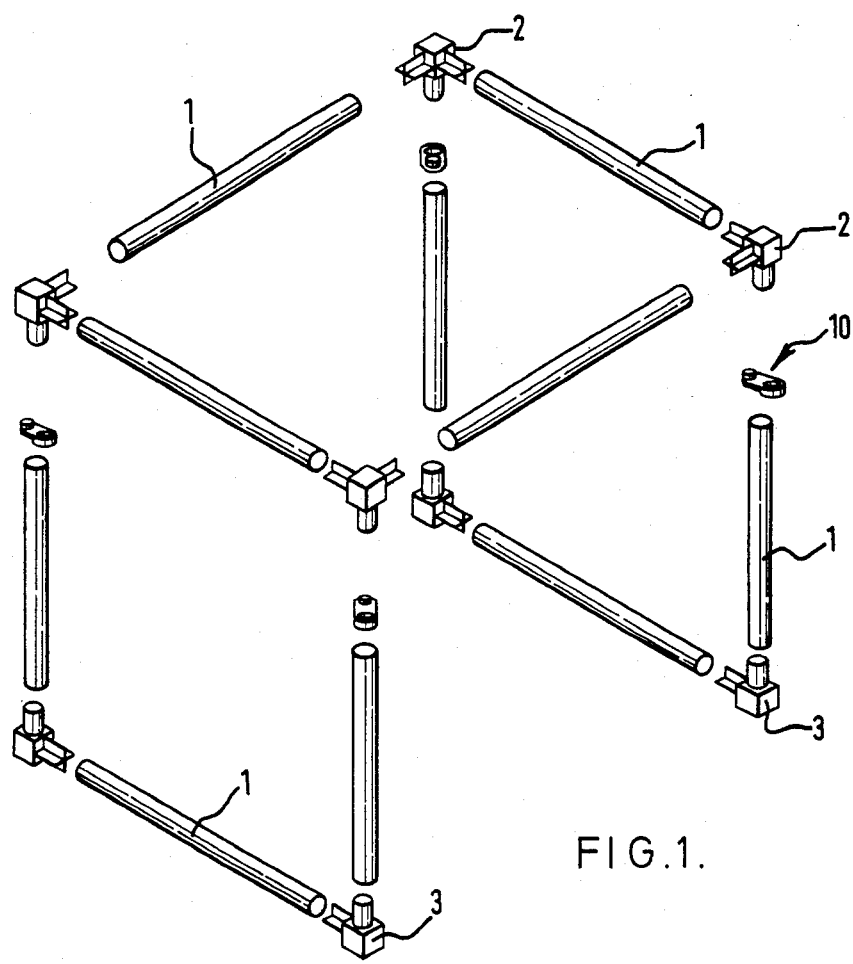
FIG. 1 shows, in perspective and exploded, a frame structure in accordance with the present invention.
Figure 2:
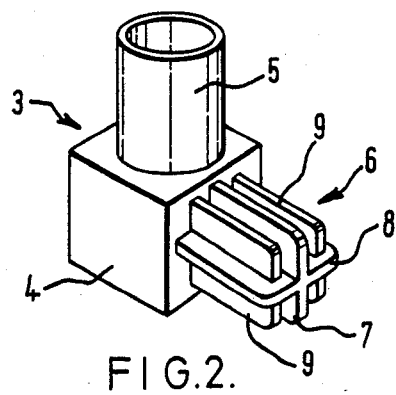
FIG. 2 shows, in perspective, one form of coupling element used in the frame structure.

FIG. 1 shows a cubic frame made from straight structural members 1 each of which is tubular or has a cylindrical socket at each end. These members may consist of ordinary rigid plastics pipe, for example of PVC or polyethylene, depending on the desired strength of the structure. The structural members are fastened together by coupling elements 2, 3. FIG. 2 shows a coupling element 3 on a larger scale. It consists of a cubic body 4 with a tubular cylindrical spigot 5 projecting at right angles from one face of the body, and a spigot 6 projecting at right angles from an adjacent face.

The coupling element is of injection-moulded plastics material such as those mentioned above, and its design facilitates moulding. The spigot 6 consists of flat blades 7, 8 each projecting at right angles from the face of the cubic body, and forming a cross. A pair of smaller blades 9 are parallel to the blade 7 and at right angles to the blade 8 on opposite sides of the central blade 7. Their dimensions are such that the edges of the blades touch an envelope curve which is a circle of radius corresponding to the internal radius of the structural members. The secondary blades 9 are desirable but not obligatory: FIG. 1 shows spigots composed only of the crossed main blades 7, 8.

Figure 3:
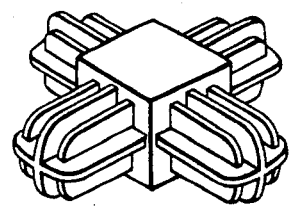
FIGS. 3 to 7 show further coupling elements.
Figure 4:
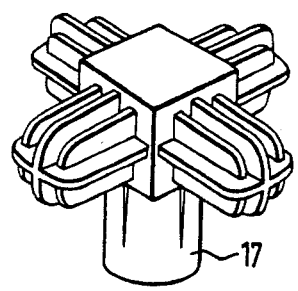
Figure 5:
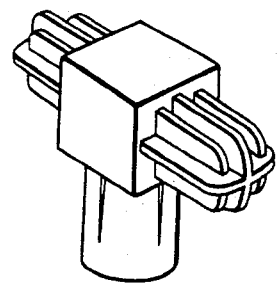

It will be readily understood that the design of the coupling element, with only a single tubular spigot and the other spigot or spigots composed of flat members, makes mould design much easier in that only a relatively small number of mould parts is required, with relatively simple movements, to allow the mould to be stripped from the moulded component. It is possible for all the spigots to consist of flat blades, as in the case of the four-spigot coupling element shown in FIG. 3. However, the ejection of such a component from a mould involves the use of relatively small ejection pins which are liable to break or jam. By providing one of the spigots 5 in the form of a tube, we enable a single large ejector pin to be used.

Figure 6:
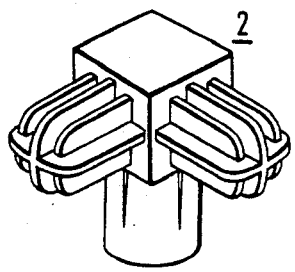
Figure 7:
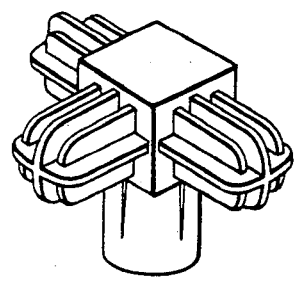

Different numbers of spigots can be provided, so that frame structures of different shapes can be built up; FIGS. 3 to 7 show various forms of coupling element, of which FIG. 6 shows the three-spigot coupling element 2 shown in FIG. 1. The coupling of FIG. 4 can be modified by having a second cylindrical spigot opposite the illustrated single cylindrical spigot. One cylindrical spigot or both may have longitudinal ribs to grip a structural member, e.g. as shown at 17 in FIG. 4.

The spigot 6 has a further advantage in that the edge regions of the flat blades have a limited amount of flexibility, inherent in the nature of the plastics material of which they are made. Furthermore, because the spigot does not have a solid external profile, a plastics tube fitted over the spigot can become distorted to a limited extent, by virtue of the gaps between the flat blades. The result is that, by virtue of the possibility of flexing of the blade edges, and distortion of the tubular structural member, it is possible to ensure, at the same time, a relatively easy fit of the spigot into the tubular member and a good grip between the spigot and the tubular member, without observing very tight manufacturing tolerances. Excellent performance can therefore be obtained at relatively low cost.

In the case of the tubular spigot 5, the combination of an easy fit and good grip can be achieved only if both the spigot and structural members are made to close tolerances, which is impractical or at least unduly expensive. Accordingly, the tubular spigot 5 is made to ensure that it will fit the structural members even at the limits of normal manufacturing tolerances. This means that in many cases the spigot will be slightly loose in the structural member and therefore this spigot 5 should be used only in positions and orientations such that a reliable grip between it and the associated structural member is not required, in particular with this spigot vertical so that the weight of the various components will hold the spigot and structural member together, as in the structure shown in FIG. 1.

Figure 8:
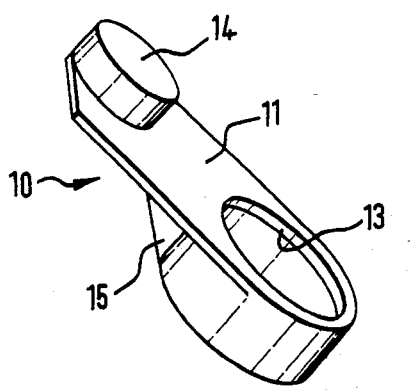
FIGS. 8 and 9 are perspective views of a shelf clip or bracket.
Figure 9:
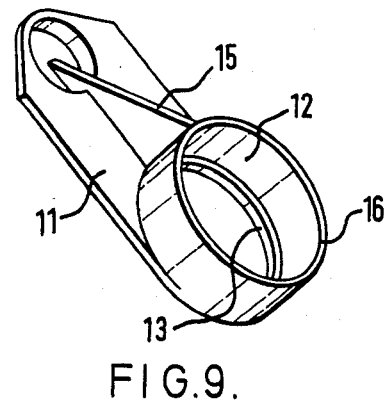

As shown in FIG. 1, the upright structural members are fitted with shelf clips or brackets 10, shown on a larger scale in FIGS. 8 and 9. Each of these consists of a flat arm 11 at one end of which is a circular seat 12 of internal diameter equal to the external diameter of a structural member. At the top of the seat 12, level with the arm 11, is an internal shoulder 13 having an internal diameter substantially equal to or slightly greater than the external diameter of a spigot 5 or 6. At the other end of the arm 11, on its upper surface, is a support pad 14. A stiffening rib 15 extends along the underside of the arm, from the collar 16 that defines the seat 12, to the pad 14. The shaft clip or bracket is made of moulded plastics material.

In use, the collar 16 is seated over the upper end of a structural member, and a spigot of a coupling element is inserted within the shoulder 13 and into the upper end of the structural member, thereby holding the shelf clip or bracket in place on the structural member.

The arm 11 is adjusted to project laterally from the structural member at a desired angle. When all the necessary shelf clips or brackets have been installed, a shelf can be placed on them. The pads 14 ensure that the shelf rests level with the middle, or even the upper parts of the adjacent horizontal structural members; this arrangement provides a near finish and can eliminate gaps between the shelves and structural members.

Shelf clips or brackets can be provided with two, three for four arms 11, to enable different arrangements of shelves to be installed in a frame structure embodying the invention.

Figure 10:
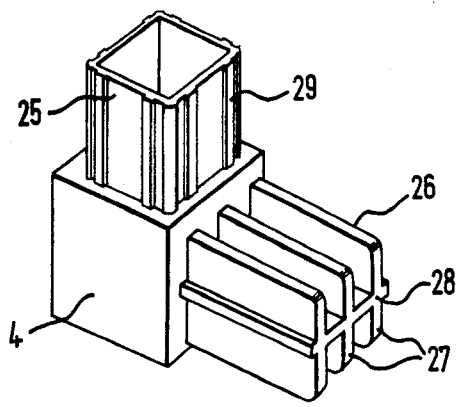
FIGS. 10 and 11 show couplings for frames of square-section tubes.
Figure 11:
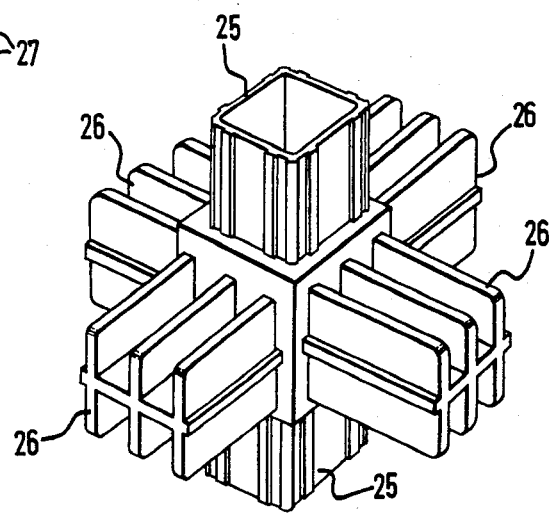
Figure 12:
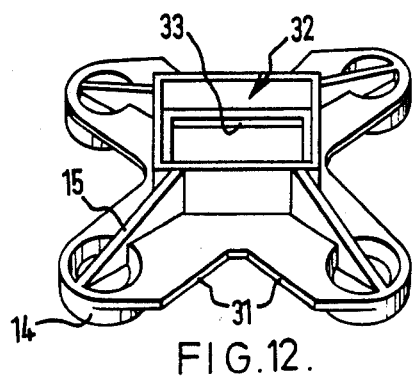
FIG. 12 shows a shelf clip or bracket for square-section tubes.

FIGS. 1 to 9 show components for use with cylindrical tubes or structural members with cylindrical sockets. Tubes or sockets of other cross sections can however be used, and FIGS. 10 to 12 show by way of example components for use with tubes or sockets of square cross section. FIG. 10 shows a coupling element with a cubic body 4 and two integral spigots analogous to those shown in FIG. 2 but of square cross section. These comprise a tubular spigot 25 and a spigot 26, at right angles to one another. The spigot 26 consists of three flat blades 27 projecting at right angles from the face of the cubic body, of substantially constant or slightly tapered width and parallel to each other, and a flat blade 28 at right angles to the blades 27 and to the face of the body. The blades 27, 28 are integral with each other and with the body and their dimensions are such that the lateral edges of the blades touch an envelope which is a square of dimensions corresponding to the internal dimensions of the structural members.

The tubular spigot 25 of square cross section has longitudinal ribs 29 on its faces, to facilitate gripping in the end of a structural member.

As in the case of the coupling elements shown in FIGS. 1 to 7, coupling elements with spigots of the kind shown in FIGS. 10 can be provided with different numbers of spigots, for example in arrangements analogous to FIGS. 3 to 7. FIG. 11 shows such a coupling element, with six spigots, of which two opposite spigots are tubular spigots 25, and the other four spigots are spigots 26 consisting of flat blades. The six spigots are at right angles to one another.

For use with structural members of rectangular cross section, shelf clips or brackets are provided generally analogous to that shown in FIGS. 8 and 9 but with seats shaped to fit the square-section structural members. The shelf clips or brackets can be provided with any desired number of arms, in particular one, two, three or four arms. FIG. 12 shows by way of example a shelf clip or bracket with four flat arms 31 each integral with a support pad 14 and a longitudinal stiffening rib 15 generally analogous to those shown in FIGS. 8 and 9. At the centre is a square seat 32 of internal dimensions equal to the external dimensions of a structural member, with an internal shoulder 33 at the top having internal dimensions substantially equal to or slightly greater than the external dimensions of a spigot 25 or 26.

Figure 13:
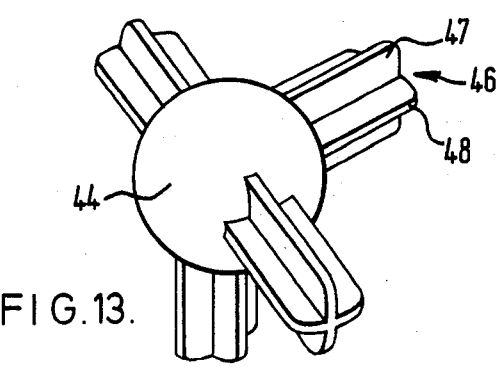
FIG. 13 shows a coupling for frames of cylindrical tubes.

FIG. 13 shows a further coupling element for use with cylindrical structural members. In this case the body 44 is spherical and the integral spigots 46 each consisting of flat blades 47, 48 intersecting at right angles to form a cross and each having a width equal to the internal diameter of a structural member. The spigots are arranged in three directions at right angles to one another. Any number of spigots from 2 to 6 can be provided. All of the spigots may consist of flat blades or one or two of the spigots may be cylindrical in a manner analogous to the coupling elements described with reference to FIGS. 1 to 7.

As already mentioned, spigots not composed of flat blades may have longitudinal ribs to enable them tor grip the internal surfaces of structural members. These ribs may taper from the end near the body to the end remote from the body of the coupling element, to facilitate fitting into a structural member.

The coupling element shown in FIG. 13 can be used with suitable shelf clips or brackets, for example as shown in FIGS. 8 and 9.

All of the illustrated coupling elements and shelf clips or brackets are designed so that they can be made easily by injection moulding thermoplastic materials.

The invention has been described with reference to structural members of circular or square internal cross section, but is equally applicable to structural members of different cross sections, the shapes and dimensions of the spigots and bodies of the coupling elements, and of the seats of the shelf clips or brackets, being suitably selected. In the case of FIG. 1, the external profile of each structural member is circular, like its internal profile, but it would also be possible to use structural members having an external profile different from the internal profile, for example with a cylindrical internal profile in a structural member of square external profile to match the bodies of the coupling elements. In this case, each shelf clip or bracket would have a seat with a square internal profile, but the shoulder within the seat would have a circular aperture.

I claim:

1. A system for assembling a structural framework, said system comprising a plurality of elongated structural members having hollow ends, and a plurality of coupling members adapted to be fit into said hollow ends for interconnecting said structural members, said coupling members being formed of resilient plastic material, each of said coupling members having a body portion and at least two coupling spigots which project outwardly from said body portion and which are engageable within said hollow ends, at least one of said spigots only comprising flat blades which extend outwardly from said body portion, said blades comprising a plurality of parallel blades extending from said body portion and and a single flat blade projecting outwardly from said body transverse to said parallel blades, said transversely extending blade having first and second ends and interconnecting said plurality of parallel blades, all of said parallel blades being located between said first and said second ends of said transversely extending blade, said blades having edges, said edges together defining an external profile which is discontinuous over the circumference of said spigot, said profile substantially extending over the length of said spigot, said profile generally corresponding in size and shape to a cross-section of one of said ends.

2. An assembly in accordance with claim 1 wherein one of said spigots is tubular.

3. A system in accordance with claim 1 wherein one of said spigots has a rod-like configuration.

4. An assembly for a structural framework comprising a plurality of elongated structural members having hollow ends, and a plurality of coupling elements, each of said coupling elements having a body portion and a plurality of spigots projecting outwardly therefrom, at least one of said spigots comprising only flat blades which extend outwardly away from said body portion, said blades comprising a plurality of parallel blades extending from said body portion and a single flat blade projecting outwardly from said body transverse to said parallel blades, said single flat blade having first and second ends and interconnecting said plurality of parallel blades, said parallel blades being located between said first and second ends of said single flat blade, said blades having edges, said edges together defining an external profile which is discontinuous over the circumference of said spigot, said spigots being adapted to fit within said hollow ends to interconnect said structural members, and a plurality of support elements, each support element comprising a socket which has a seating portion adapted to fit over and abut against said structural member ends, each support element further comprising at least one support arm extending laterally from said seat portion, said seat portion having at least one aperture which is adapted to receive one of said spigots, which is adapted to be inserted into one of said hollow ends.

* * * * *